United States Patent [19]

Wieners et al.

[11] Patent Number: 5,032,654

[45] Date of Patent: Jul. 16, 1991

[54] TRANSPARENT POLYMER MATERIAL

[75] Inventors: Gerhard Wieners, Frankfurt am Main; Rudolf Heumüller, Bad Soden am Taunus; Jochen Coutandin, Bretzenheim; Werner Groh, Frankfurt am Main; Peter Herbrechtsmeier, Königstein, all of Fed. Rep. of Germany

[73] Assignee: Hoechst Aktiengesellschaft, Frankfurt am Main, Fed. Rep. of Germany

[21] Appl. No.: 113,469

[22] Filed: Oct. 23, 1987

[30] Foreign Application Priority Data

Oct. 25, 1986 [DE] Fed. Rep. of Germany ....... 3636401

[51] Int. Cl.$^5$ .............................................. C08F 20/22
[52] U.S. Cl. ...................................... 526/245; 526/296
[58] Field of Search ................... 526/245, 292.1, 292.3, 526/292.5, 296

[56] References Cited

U.S. PATENT DOCUMENTS 3,817,913 6/1974 Gaenzler et al. ................ 526/292.3
3,932,321 1/1976 Maki ..................................... 525/146
4,110,296 8/1978 Wang ............................... 526/292.2

FOREIGN PATENT DOCUMENTS 2202791 8/1973 Fed. Rep. of Germany .
3518617 11/1985 Fed. Rep. of Germany .
60-242404 12/1985 Japan .
091507 4/1987 Japan .
2089523 6/1982 United Kingdom .
2159164 11/1985 United Kingdom .

OTHER PUBLICATIONS

Chemical Patents Index, Basic Abstracts Journal, Sec. A, Week 8631, 9/24/86, A0337, No. 86-199899/31, Derwent Pub. Ltd.
Database Chem. Abs., 2/8/84, 104:169692d.
Chem. Abs. Service Reg. Handbk, 1986 Supp., Pt 1, p. 1515R0 Registry No. 101626-65-7.
Chem. Patents Index, Basic Abstract Journal, Sec. A, Week 8742, 12-16-87, A0643, No. 87-295938/42, Derwent Pub.

Primary Examiner—Christopher Henderson

[57] ABSTRACT

A transparent material of very good heat resistance and very good light conductivity is essentially composed of a polymer derived mainly from bromophenyl acrylates or bromophenyl methacrylates.

6 Claims, No Drawings

TRANSPARENT POLYMER MATERIAL

DESCRIPTION

The invention relates to a transparent material which is suitable for the preparation of polymer glasses and optical articles such as lenses and optical waveguides for the transmission of light signals. These articles have a high heat resistance.

Optical waveguides can comprise a core and a shell, the core material always having a refractive index higher than that of the shell material. The core material and shell material of such an optical waveguide should absorb as little light as possible.

The polymeric materials hitherto employed most frequently for optical waveguides are homopolymers and copolymers of methyl methacrylate. Whereas halogen-containing polymers have also been employed for the core, exclusively fluorinecontaining polymers have hitherto been used for the shell, because they have a lower refractive index. To reduce the light absorption, it has also already been proposed to replace the hydrogen atoms in the monomers and polymers by deuterium.

Copolymers of methyl methacrylate with a compound of the formula $CH_2=CR-(CO-O)_n-ArBr_m$ ($R=H$, $CH_3$; $n=$zero or 1, $m=1$ to 5) (cf. German Offenlegungsschrift 2,202,791). Acrylates and methacrylates of mono-, di-, tri-, tetra- and pentabromophenol are mentioned by name. The proportion of the bromine-containing comonomer is 44 per cent as a maximum.

Copolymers of trifluoromethacrylate and styrene or substituted styrenes, for example halogen-containing styrene, are also known (cf. German Offenlegungsschrift 3,518,617).

The copolymers are used, inter alia, as the shell material for optical fibers.

Finally, an optical waveguide has also been described, the core material of which is prepared by block polymerization of, inter alia, halogenated aryl methacrylate, for example pentafluorophenyl methacrylate (cf. Japanese Published Application 60-242,404). Copolymers of vinylidene fluoride, tetrafluoroethylene and hexafluoropropylene are used as the shell material.

However, the abovementioned polymers do not give optical waveguides having a heat resistance adequate for certain fields of application.

It has now been found that a transparent material having very good heat resistance and good light conductivity is obtained when it is essentially composed of a polymer derived mainly from bromophenyl acrylates or bromophenyl methacrylates.

The invention thus relates to a transparent material composed essentially of an amorphous halogen-containing polymer, wherein the polymer is composed to the extent of at least 50 per cent by weight of units derived from an ester of the formula (I)

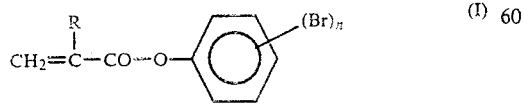

in which R is a hydrogen atom, a fluorine atom or a methyl group and n is an integer from 1 to 5.

The invention also relates to a process for the preparation thereof.

In the formula (I), R is preferably a fluorine atom or a methyl group, especially a methyl group. n is preferably 3, 4 or 5, especially 5.

Examples of compounds, to be employed according to the invention, of the formula (I) are:

Bromophenyl acrylate, dibromophenyl acrylate, tetrabromophenyl acrylate, pentabromophenyl acrylate, bromophenyl fluoroacrylate, tribromophenyl fluoroacrylate, tetrabromophenyl fluoroacrylate, pentabromophenyl fluoroacrylate, bromophenyl methacrylate, tribromophenyl methacrylate, tetrabromophenyl methacrylate and pentabromophenyl methacrylate.

Of these monomers, pentabromophenyl acrylate, pentabromophenyl fluoroacrylate and pentabromophenyl methacrylate, especially pentabromophenyl methacrylate, are used preferably.

The monomers can be prepared in the known manner by reacting an acryloyl halide, α-fluoroacryloyl halide or methacryloyl halide with a (poly)bromophenol.

In addition, the polymers according to the invention contain units derived, for example, from the following monomers:

Alkyl acrylates, alkyl methacrylates, styrene, α-methylstyrene, vinyl chloride and other halogen-containing monomers, maleic anhydride, acrylic acid and acrylonitrile.

Methyl methacrylate, styrene, hexafluoroisopropyl methacrylate, acrylonitrile and acrylic acid are preferred.

The polymers prepared from the said monomers by free-radical block polymerization are composed to the extent of at least 50% by weight, preferably 60 to 100% by weight, of units derived from compounds of the formula (I). 0 to 50% by weight, preferably 0 to 40% by weight, of the units are derived from the monomers of the second group.

The polymers and copolymers according to the invention have a glass transition point from 120° to 260° C., preferably 150° to 240° C., especially 165° to 240° C. The polymers are transparent and thermoplastically processable and constitute the material for the production of optical waveguides which can also comprise a core and shell. The polymer for the shell of the optical waveguides can here be constituted by the same monomers as the polymer for the core. However, the halogen content in the shell polymer must be so low that the refractive index of the shell polymer is lower than that of the core polymer.

Optical waveguides can be prepared from the transparent material according to the invention by processes known per se:

1. Extrusion of a shell-less optical waveguide by means of an extruder.
2. Coextrusion of a core component and shell component by means of an extruder and a bi-component spinneret.
3. Extrusion of a core and subsequent extrusion-coating with a shell polymer.
4. Extrusion of a core and subsequent application of a shell polymer in a solvent.
5. Extrusion of a core and subsequent application of a shell polymer in the form of a dispersion, drying and sintering of the dispersion or dispersion film.

The optical waveguides prepared from the transparent material according to the invention are distinguished by a very good heat resistance and can therefore be used in locations with a high heat stress, for example in automobiles.

EXAMPLE 1

Copolymer of methyl methacrylate (MMA) and pentabromophenyl α-fluoroacrylate (PBP-FA)

In the preparation of the monomers, PBP-FA was dissolved in toluene at the boil in a nitrogen atmosphere and slowly crystallized out, finally with ice cooling, filtered off and dried.

In a stirred autoclave with a powerful stirrer and a downward tapering reaction space lined with polytetrafluoroethylene, a vigorous stream of nitrogen was passed for 30 minutes into 40 parts by weight of MMA, to which 0.025 part of tert.-butyl perbenzoate and 0.5 part of dodecylmercaptan have been added. 60 parts of PBP-FA were added to the mixture and, in the sealed autoclave filled to a level of one third, the mixture was kneaded for one hour and simultaneously heated to 115° C. During this time, the viscosity of the mixture initially decreased, as could be read from the power consumption of the stirrer. In the course of a further hour, it rose again. After these 2 hours, the stirrer was withdrawn upwards from the reaction mixture; the temperature was maintained at 115° C. for a further 5 hours and then increased to 150° C. for a further 2 hours. The autoclave was then cooled and the clear polymer body which had solidified as a glass, was removed. The glass point of the product was determined by means of the DSC method as TG = 155° C.; the weight average of the degree of polymerization was obtained as $P_w = 1000$ by means of a comparison with a polystyrene standard in GPC.

In a mold at 250° C. under pressure, the material could be shaped to give lenses and similar optical articles. After polishing the surface of a lens, a transmission of 83% of the incident light was reached.

The transmission and imaging properties of this lens remained unchanged even after storage for 24 hours at 100° C. and an atmospheric humidity of 100 mbar.

Comparison example A:

A lens formed under corresponding conditions from a polymer glass body of polymethyl methacrylate (PMMA) showed, after polishing, a transmission of 87% and comparably good imaging properties. Even after storage for 2 hours at 120° C., the surface of the lens was markedly turbid and the shape of the lens had changed to such an extent that a useful image was no longer obtained.

EXAMPLE 2

Copolymer of MMA and PBP-FA

A copolymer which had been prepared as described in Example 1, but with the addition of 1.5 instead of 0.5 parts of dodecylmercaptan, had a weight average of the degree of polymerization of $P_w = 400$. This material was considerably easier to process into articles of somewhat lower optical quality, such as inspection windows and covers for fittings. After storage for 24 hours at 100° C. and 100 mbar atmospheric humidity, the light transmission of a specimen fell from 80 to 78%.

EXAMPLE 3

Copolymer of methyl methacrylate (MMA) and pentabromophenyl acrylate (PBP-A)

34 parts of PBP-A were dissolved in 16 parts of MMA and 20 parts of toluene at 90° C. This solution was saturated with nitrogen and held ready, blanketed with nitrogen, in a heated stock vessel with a metering device. 11 parts of MMA, 0.1 part of tert.-butyl isopropylperoxycarbonate and 0.5 part of dodecylmercaptan were introduced into a (pressure-resistant) reaction vessel having a stirrer, and saturated with nitrogen. 39 parts of solid PBP-A were added to this solution. The reaction vessel was then heated to 90° C. with vigorous mixing. The solution soon cleared, and the start of the polymerization was detectable by a slight rise in the viscosity. 15 minutes after the start of polymerization, a sample was taken from the mixture and the MMA/PBP-A concentration ratio was determined (by gas chromatography). Corresponding to the increased consumption of MMA, further parts of the PBP-A/MMA/toluene solution were metered in continuously, and the metering rate was adjusted correspondingly to the results of further analyses (by gas chromatography) such that an MMA:PBP-A ratio of 1:3.5 (weight/weight) was maintained.

After the end of the further addition, the reaction mixture was heated to 100° C. and maintained at this temperature for 2 hours. The mixture was then transferred into a two-stage vented extruder, where the solvent and monomer residues were removed. (The material was further converted to granules). The glass point was $T_G = 151°$ C. and the mean degree of polymerization was $P_w = 1200$.

EXAMPLE 4

Optical waveguide of an MMA/PBP-A copolymer

The polymerization was carried out as described in Example 3, except that the polymer was directly processed, without granulation, to give an optical waveguide. Of the light intensity radiated into one end face of the optical wave-guide, 45% was still measurable after three meters length and 70% after one meter.

After the fiber had been stored for 7 days at 120° C. and 100 mbar atmospheric humidity, 70% of the light intensity radiated in was still detectable after one meter length and 43% after three meters.

Comparison example B:

Optical waveguide of polymethyl methacrylate (PMMA)

A three meter long piece of an optical waveguide of PMMA showed a light transmission of 70% at the start of the experiment. Even after storage for three hours at 110° C., the length of the fiber had shrunk to half and the light transmission had fallen to 10% of the light intensity radiated in.

We claim:

1. A transparent material consisting essentially of an amorphous halogen-containing polymer, wherein the polymer is comprised to the extent of at least 50 per cent by weight of units derived from an ester of the formula I

in which R is a fluorine atom and n is an integer from 1 to 5, said transparent material being of optical quality.

2. A material as claimed in claim 1, wherein the ester of the formula (I) is pentabromophenyl α-fluoroacrylate.

3. A material as claimed in claim 1, wherein the amorphous halogen-containing polymer has a glass transition point of 120° to 260° C.

4. A material as claimed in claim 1, wherein n is an integer from 3 to 5.

5. A material as claimed in claim 1, wherein the polymer consists essentially of a copolymer of the monomers pentabromophenyl alpha-fluoroacrylate and methyl methacrylate.

6. A transparent material consisting essentially of an amorphous halogen-containing polyer, wherein the polymer comprises at least 50 per cent by weight of units derived from an ester of the formula

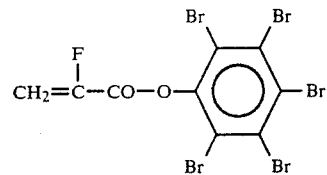

said transparent material being of optical quality.

* * * * *